United States Patent
Hirose et al.

(10) Patent No.: US 7,331,316 B2
(45) Date of Patent: Feb. 19, 2008

(54) CONTROL APPARATUS AND CONTROL METHOD FOR INTERNAL COMBUSTION ENGINE

(75) Inventors: Kiyoo Hirose, Nagoya (JP); Kazuto Ikeda, Takahama (JP); Hiroshi Morita, Obu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/541,565

(22) Filed: Oct. 3, 2006

(65) Prior Publication Data

US 2007/0084425 A1 Apr. 19, 2007

(30) Foreign Application Priority Data

Oct. 18, 2005 (JP) .............................. 2005-303247

(51) Int. Cl.
*F01L 9/02* (2006.01)
(52) U.S. Cl. .............................. 123/90.12; 123/90.15; 123/90.16; 123/90.17
(58) Field of Classification Search ............. 123/90.15, 123/90.16, 90.17, 90.31, 90.12
See application file for complete search history.

(56) References Cited

U.S. PATENT DOCUMENTS 6,401,675 B1 * 6/2002 Nakamura et al. ....... 123/90.15

2002/0043243 A1 * 4/2002 Majima ...................... 123/399

FOREIGN PATENT DOCUMENTS

| JP | A 5-215000 | 8/1993 |
| JP | A 2001-263015 | 9/2001 |
| JP | A 2005-36673 | 2/2005 |

* cited by examiner

*Primary Examiner*—Zelalem Eshete
(74) *Attorney, Agent, or Firm*—Oliff & Berridge, PLC (57) ABSTRACT

If it is determined that an engine has been started, an engine coolant temperature is detected. If the engine coolant temperature is equal to or lower than a threshold value, the catalyst quick warm-up control is started to retard ignition timing, and a signal indicating a command to increase an operate angle is transmitted to a VVLA controller. When a VVT hydraulic pressure is increased to a predetermined value, a signal indicating a command to decrease the operate angle is transmitted to the VVLA controller, and a signal indicating a command to advance open timing of an intake valve is transmitted to a VVT controller so that the open timing of the intake valve is not changed. If the engine coolant temperature is equal to or higher than a threshold value, the catalyst quick warm-up control ends, and the ignition timing is returned to normal timing.

14 Claims, 4 Drawing Sheets

CONTROL APPARATUS AND CONTROL METHOD FOR INTERNAL COMBUSTION ENGINE

INCORPORATION BY REFERENCE

The disclosure of Japanese Patent Application No. 2005-303247 filed on Oct. 10, 2005 including the specification, drawings and abstract is incorporated herein by reference in its entirety.

BACKGROUND OF THE INVENTION

1. Field of the Invention

The invention relates generally to a control apparatus and method for an internal combustion engine. More specifically, the invention relates to a control apparatus for an internal combustion engine, which includes a variable valve mechanism that is hydraulically actuated by the hydraulic fluid discharged from an oil pump driven by an engine, and another variable valve mechanism that is electrically actuated by an electric motor, and a control method thereof.

2. Description of the Related Art

Usually, an exhaust system of an engine is provided with a catalytic converter that removes specific elements contained in exhaust gas. As such catalytic converter, a three-way catalytic converter is widely used. The three-way catalytic converter oxidizes carbon monoxide (CO) and unburned carbon hydride (HC), and reduces nitrogen oxide (NOx) to convert them into carbon dioxide ($CO_2$), water vapor ($H_2O$), and nitrogen ($N_2$). Carbon monoxide (CO), unburned carbon hydride (HC), and nitrogen oxide (NOx) are three specific elements, to be removed, contained in the exhaust gas.

When the temperature of a catalyst included in the three-way catalytic converter is low, the catalyst does not function properly. Accordingly, when the engine is started while it is cold, the temperature of the catalyst needs to be increased quickly. Otherwise, unstable combustion takes place, which makes it difficult to purify the exhaust gas containing a great amount of the three specific elements described above.

Japanese Patent Application Publication No. JP-A-05-215000 describes an engine warm-up promotion device that promotes warm-up of an engine based on the combustion state in the engine. The engine warm-up promotion device is used in an engine including a bypass passage through which intake air may bypass a throttle valve arranged in an intake system; and a bypass valve that is arranged in the bypass passage and that adjusts the engine speed when the engine is operating at no load and low speed. The engine warm-up promotion device includes valve overlap duration changing means for changing a valve overlap duration during which both an intake valve and an exhaust valve are open; ignition timing changing means for changing ignition timing; warm-up state detecting means for detecting an warm-up state of the engine; operating state detecting means for detecting an operating state of the engine; and control means. When a signal from the operating state detecting means indicates that the engine is operating at no load and low speed, in the case where a signal from the warm-up state detecting means indicates that the engine is cold, the control means increases the valve overlap duration and retards the ignition timing as compared to the case where the engine is warm.

With the described engine warm-up promotion device, if the valve overlap duration is increased, the amount of gas remaining in a cylinder increases and the combustion proceeds more slowly. In addition, if the ignition timing is retarded, the combustion takes place at a later time. Because the combustion takes place at the later time and proceeds more slowly, exhaust gas having a high-temperature is discharged through an exhaust port. The high-temperature exhaust gas is used to increase the temperatures of engine coolant flowing in a cylinder heard and a catalyst arranged in an exhaust system.

In many cases, a valve overlap duration is increased by advancing open timing of an intake valve and retarding close timing of an exhaust valve using a variable valve mechanism called a variable valve timing controller (hereinafter, simply referred to as a "VVT controller"). Usually, an oil control valve (hereinafter, simply referred to as an "OCV"), operated by hydraulic fluid discharged from an oil pump driven by an engine, is used as an actuator for the VVT controller. The VVT controller is set to perform control so that the valve overlap duration becomes shortest when the engine is at a standstill. Accordingly, even if the open timing of the intake valve attempts to be advanced using the VVT controller immediately after the engine is started while it is cold, the valve overlap duration cannot be increased sufficiently, because the hydraulic pressure of the hydraulic fluid is low (in addition, the viscosity of the hydraulic fluid is high).

Japanese Patent Application Publication No. JP-A-05-215000, however, does not mention such inconvenience. Accordingly, with the engine warm-up promoting device described in this publication, the valve overlap duration may not be increased sufficiently immediately after the engine is started while it is cold. As a result, the engine may not be warmed quickly.

SUMMARY OF THE INVENTION

The invention is made in light of the above-described circumstances. The invention therefore provides a control apparatus for an internal combustion engine, which includes a variable valve mechanism and which performs a quick warm-up when the internal combustion engine is started while it is cold, and a control method thereof.

A first aspect of the invention relates to a control apparatus for an internal combustion engine, which includes an electric variable valve mechanism, a warm-up determination portion, a first control portion, and a second control portion. The electric variable valve mechanism is actuated by an electric actuator. After the internal combustion engine is started, the warm-up determination portion determines whether a warm-up needs to be performed. If it is determined that the warm-up needs to be performed, the first control portion controls the electric variable valve mechanism so that a valve overlap duration is increased. The second control portion controls the internal combustion engine so that ignition timing is retarded based on an increase in the valve overlap duration.

According to the first aspect of the invention, even if the pressure of hydraulic fluid is low immediately after the internal combustion engine is started, the valve overlap duration is increased by the electric variable valve mechanism, unlike the case where only a hydraulic variable valve mechanism, which is hydraulically actuated by the hydraulic fluid discharged from an oil pump driven by the internal combustion engine, is used. The amount of gas remaining in a cylinder is increased by increasing the valve overlap duration. As a result, the combustion proceeds more slowly. Also, the ignition timing is retarded. As a result, the combustion state is brought into the so-called "afterburning" state in which combustion of the air-fuel mixture takes place at the late stage of the power stroke. Thus, the exhaust gas having a high-temperature is discharged from the engine. Because the high-temperature exhaust gas passes through an exhaust port, a great amount of heat is transferred to a cylinder head. Thus, the internal combustion engine is warmed more quickly. Also, a catalytic converter arranged in an exhaust system is activated quickly. It is, therefore, possible to provide the control apparatus for an internal combustion engine, which includes the variable valve mechanism and which performs a quick warm-up when the internal combustion engine is started while it is cold.

A second aspect of the invention relates to the control apparatus according to the first aspect of the invention. The control apparatus according to the second aspect further includes a hydraulic variable valve mechanism, an operation determination portion, and a switching portion. The hydraulic variable valve mechanism is hydraulically actuated by hydraulic fluid discharged from an oil pump that is driven by the internal combustion engine. Base on the pressure of the hydraulic fluid, the operation determination portion determines whether the hydraulic variable valve mechanism is able to operate properly. If it is determined that the hydraulic variable valve mechanism is able to operate properly, the switching portion switches a mechanism used to increase the valve overlap duration from the electric variable valve mechanism to the hydraulic variable valve mechanism.

According to the second aspect of the invention, when the pressure of the hydraulic fluid is increased to a predetermined value, it is determined that the hydraulic variable valve mechanism is able to operate properly. Then, the mechanism used to increase the valve overlap duration is switched from the electric variable valve mechanism to the hydraulic variable valve mechanism. When the electric variable valve mechanism is a mechanism that changes a valve lift along with an operate angle, the valve overlap duration is increased by increasing the operate angle. In this duration, the valve lift is also great. The hydraulic variable valve mechanism can increase the valve overlap duration independently of the valve lift. Accordingly, the mechanism used to increase the valve overlap duration is switched to the hydraulic variable valve mechanism so that the valve lift is decreased and the intake air amount is also decreased. As a result, the fuel efficiency improves.

A third aspect of the invention relates to the control apparatus according to the second aspect of the invention. In the control apparatus according to the third aspect of the invention, if the pressure of the hydraulic fluid is equal to or higher than a predetermined pressure, the operation determination portion determines that the hydraulic variable valve mechanism is able to operate properly.

According to the third aspect of the invention, for example, when the pressure of the hydraulic fluid is equal to or higher than the threshold value, it can be determined that the hydraulic variable valve mechanism is able to operate properly.

A fourth aspect of the invention relates to the control apparatus according to the second aspect of the invention. In the control apparatus according to the fourth aspect of the invention, the switching portion switches the mechanism used to increase the valve overlap duration from the electric variable valve mechanism to the hydraulic variable valve mechanism so that open timing of an intake valve of the internal combustion engine is not changed.

According to the fourth aspect of the invention, when the mechanism used to increase the valve overlap duration from the electric variable valve mechanism to the hydraulic variable valve mechanism, the open timing of the intake valve of the internal combustion engine is not changed. As a result, unstable combustion is avoided.

A fifth aspect of the invention relates to the control apparatus according to the first aspect of the invention. In the control apparatus according to the fifth aspect of the invention, the warm-up determination portion determines whether a warm-up for activating a catalyst, which is included in an exhaust gas purification mechanism arranged in an exhaust system of the internal combustion engine and which purifies exhaust gas, needs to be performed.

When the temperature is low, the catalyst is not activated. Accordingly, the temperature of the catalyst needs to be increased quickly. With the control apparatus according to the fifth aspect of the invention, the catalyst can be quickly activated immediately after the internal combustion engine is started while it is cold. As a result, the exhaust gas is reliably purified.

A sixth aspect of the invention relates to the control apparatus according to the first aspect of the invention. In the control apparatus according to the sixth aspect of the invention, the electric variable valve mechanism changes an operate angle of at least one of the intake valve and an exhaust valve of the internal combustion engine.

According to the sixth aspect of the invention, the valve overlap duration can be increased by changing the operate angle using the electric actuator.

A seventh aspect of the invention relates to the control apparatus according to first aspect of the invention. In the control apparatus according to the seventh aspect of the invention, the hydraulic variable valve mechanism changes actuation timing of at least one of the intake valve and the exhaust valve of the internal combustion engine.

According to the seventh aspect of the invention, the valve overlap duration can be increased by changing the operate angle and the valve lift using the electric actuator.

An eighth aspect of the invention relates to the control apparatus according to the first aspect of the invention. In the control apparatus according to the eighth aspect of the invention, the hydraulic variable valve mechanism changes actuation timing of at least one of the intake valve and the exhaust valve of the internal combustion engine.

According to the eighth aspect of the invention, the valve overlap duration is increased by advancing the open timing of the intake valve and retarding the close timing of the exhaust valve.

A ninth aspect of the invention relates to a control method according to the first aspect of the invention. A control method for an internal combustion engine, comprising: determining, after the internal combustion engine is started, whether a warm-up needs to be performed; controlling, if it is determined that the warm-up needs to be performed, an electric variable valve mechanism, which is actuated by an electric actuator, so that a valve overlap duration is increased; and controlling the internal combustion engine so that ignition timing is retarded based on an increase in the valve overlap duration.

A tenth aspect of the invention relates to the control method according to the ninth aspect of the invention. The control method, further comprising: determining, based on a pressure of hydraulic fluid discharged from an oil pump that is driven by the internal combustion engine, whether a hydraulic variable valve mechanism, which is hydraulically actuated by the hydraulic fluid, is able to operate properly; and switching, if it is determined that the hydraulic variable valve mechanism is able to operate properly, a mechanism used to increase the valve overlap duration from the electric variable valve mechanism to the hydraulic variable valve mechanism.

An eleventh aspect of the invention relates to the control method according to the tenth aspect of the invention, wherein it is determined, if the pressure of the hydraulic fluid is equal to or higher than a predetermined pressure, that the hydraulic variable valve mechanism is able to operate properly.

An twelfth aspect of the invention relates to the control method according to the tenth aspects of the invention, wherein the mechanism used to increase the valve overlap duration is switched from the electric variable valve mechanism to the hydraulic variable valve mechanism so that open timing of an intake valve of the internal combustion engine is not changed.

A thirteenth aspect of the invention relates to the control method according to the ninth aspect of the invention, wherein it is determined whether a warm-up for activating a catalyst, which is included in an exhaust gas purification mechanism arranged in an exhaust system of the internal combustion engine and which purifies exhaust gas, needs to be performed.

A fourteenth aspect of the invention relates to the control method according to the ninth aspect of the invention, wherein an operate angle of at least one of an intake valve and an exhaust valve of the internal combustion engine is changed by the electric variable valve mechanism.

A fifteenth aspect of the invention relates to the control method according to the ninth aspect of the invention, wherein an operate angle and a valve lift of at least one of an intake valve and an exhaust valve of the internal combustion engine is changed by the electric variable valve mechanism.

A sixteenth aspect of the invention relates to the control method according to the ninth aspect of the invention, wherein actuation timing of at least one of an intake valve and an exhaust valve of the internal combustion engine is changed by the hydraulic variable valve mechanism.

BRIEF DESCRIPTION OF THE DRAWINGS

The forgoing and further objects, features and advantages of the invention will become apparent from the following description of an embodiment with reference to the accompanying drawings, wherein the same or corresponding portions are denoted by the same reference numerals and wherein.

DETAILED DESCRIPTION OF THE PREFERRED EMBODIMENTS

Hereafter, a preferred embodiment of the invention will be described with reference to accompanying drawings. In the description below, the same or corresponding portions will be denoted by the same reference numerals. The names and functions of the portions having the same reference numerals are also the same. Accordingly, detailed descriptions of the portions having the same reference numerals will be given only once.

Figure 1:
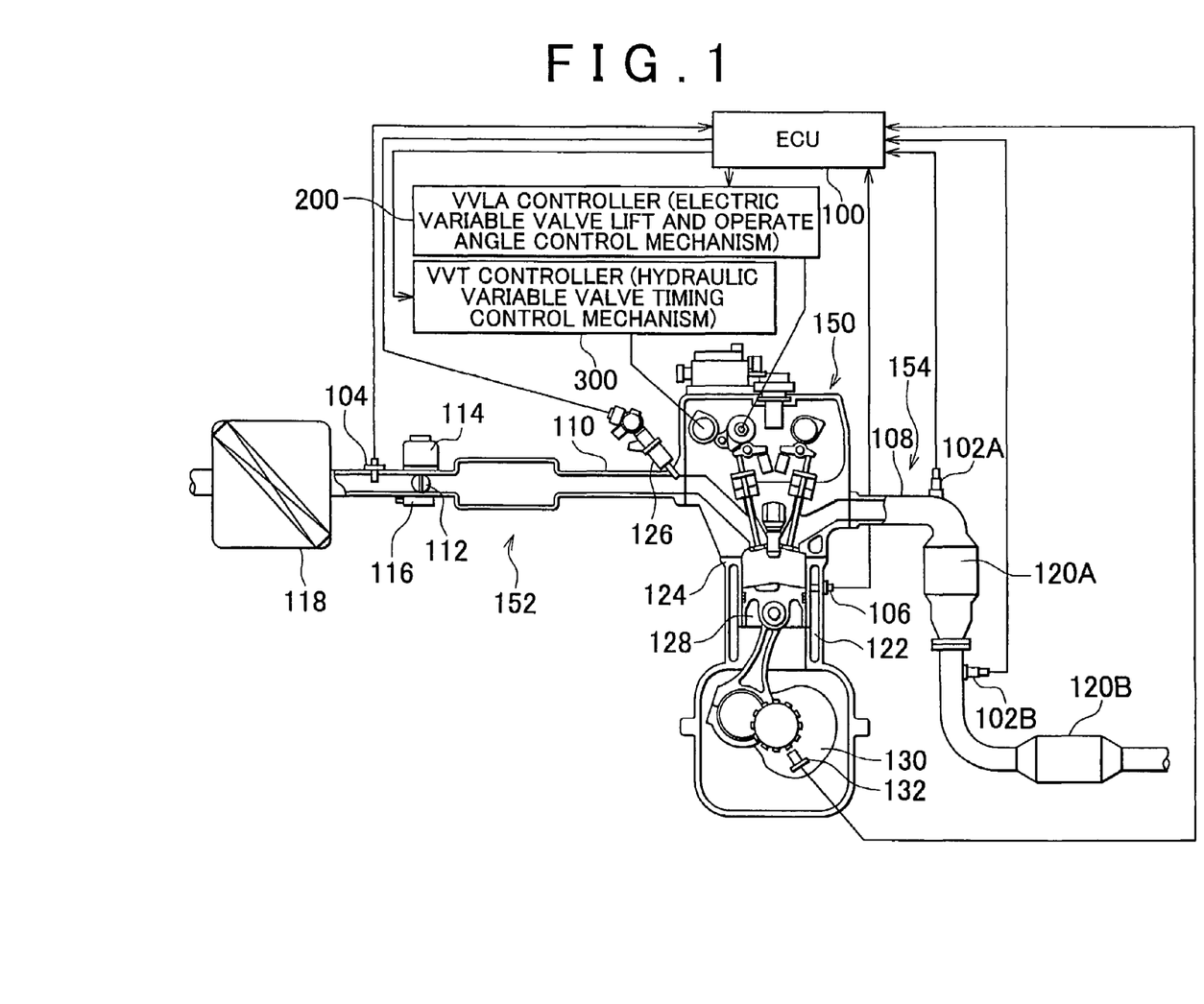
FIG. 1 is a view showing the structure of a vehicle engine mounted with a control apparatus according to an embodiment of the invention.

As shown in FIG. 1, a vehicle mounted with a control apparatus for an internal combustion engine according to the embodiment of the invention includes an engine 150, an intake system 152, an exhaust system 154, and an electronic control unit (hereinafter, simply referred to as an "ECU") 100.

The intake system 152 includes an intake passage 110, an air-cleaner 118, an air-flow meter 104, a throttle motor 114, a throttle valve 112, and a throttle position sensor 116.

The air taken in through the air-cleaner 118 flows through the intake passage 110 to be supplied to the engine 150. The throttle valve 112 is arranged in the intake passage 110. The throttle valve 112 is opened/closed by the throttle motor 114. The opening amount of the throttle valve 112 is detected by the throttle position sensor 116. The air-flow meter 104 is arranged in the intake passage 110 at a position between the air-cleaner 118 and the throttle valve 112. The air-flow meter 104 detects the intake air amount. The air-flow meter 104 transmits a signal indicating the detected intake air amount to the ECU 100.

The engine 150 includes a coolant passage 122, a cylinder block 124, an injector 126, a piston 128, a crankshaft 130, a coolant temperature sensor 106, and a crank position sensor 132.

The number of the pistons 128 corresponds to the number of cylinders formed in the cylinder block 124. Namely, the piston 128 is arranged in each cylinder formed in the cylinder block 124. An air-fuel mixture, formed of the fuel injected from the injector 126 and the intake air, is introduced through the intake passage 110 to a combustion chamber formed on the upper side of the piston 128. The air-fuel mixture is ignited by a spark plug (not shown), whereby combustion takes place. When the combustion takes place, the piston 128 moves downward. The reciprocation of the piston 128 is converted into the rotational motion of the crankshaft 130 via a crank mechanism. The ECU 100 detects an engine speed NE of the engine 150 based on a signal transmitted from the crank position sensor 132.

The coolant passage 122 is formed in the cylinder block 124. A water pump (not shown) causes the coolant to flow through the coolant passage 122. The coolant in the coolant passage 122 flows to a radiator (not shown) connected to the coolant passage 122. Then, the heat of the coolant is dissipated by a cooling fan (not shown). The coolant temperature sensor 106 is arranged on the coolant passage 122. The coolant temperature sensor 106 detects a temperature THW of the coolant flowing through the coolant passage 122. The coolant temperature sensor 106 transmits a signal indicating the coolant temperature THW to the ECU 100.

FIG. 1 shows two types of variable valve mechanisms. The first variable valve mechanism is a variable valve lift and operate angle controller (hereinafter, simply referred to as a "VVLA controller") 200 that can continuously change the valve lifts and operate angles of an intake valve and an exhaust valve, using an electric motor as an actuator. The detailed description of the VVLA controller 200 will not be given in this specification, because it is already given in Japanese Patent Application Publication No. JP-A-2001-263015. When the operate angle is increased by the VVLA controller 200, the valve lift is also increased. On the other hand, when the operate angle is decreased by the VVLA controller 200, the valve lift is also decreased. In the embodiment of the invention, any types of variable valve mechanisms may be employed as the first variable valve mechanism, as long as the employed variable valve mechanism can change at least the operate angle and can be actuated by means other than hydraulic pressure even when the engine 150 is started while it is cold.

The second variable valve mechanism is a VVT controller 300 that can continuously change the valve actuation timings of the intake valve and the exhaust valve using an OCV as an actuator. Because the VVT controller 300 is also known, the detailed description thereof will not be given in this specification. In the embodiment of the invention, any types of variable valve mechanisms may be employed as the second variable valve mechanism, as long as the employed variable valve mechanism can hydraulically change at least the actuation timings of the intake valve and the exhaust valve and cannot be actuated when the engine 150 is cold.

The exhaust system 154 includes an exhaust passage 108, a first oxygen sensor 102A, a second oxygen sensor 102B, a first three-way catalytic converter 120A, and a second three-way catalytic converter 120B. The first oxygen sensor 102A is arranged upstream of the first three-way catalytic converter 120A. The second oxygen sensor 102B is arranged at a position downstream of the first three-way catalytic converter 120A and upstream of the second three-way catalytic converter 120B. Alternatively, only one three-way catalytic converter may be provided.

The exhaust passage 108, connected to an exhaust port of the engine 150, is connected to the first three-way catalytic converter 120A and the second three-way catalytic converter 120B. Namely, the exhaust gas, generated by combustion of the air-fuel mixture in the combustion chamber of the engine 150, initially flows into the first three-way catalytic converter 120A. HC and CO contained in the exhaust gas flowing into the first three-way catalytic converter 120A are oxidized in the first three-way catalytic converter 120A. NOx contained in the exhaust gas flowing into the first three-way catalytic converter 120A is reduced in the first three-way catalytic converter 120A. The first three-way catalytic converter 120A is arranged near the engine 150. Even when the engine 150 is started while it is cold, the temperature of the first three-way catalytic converter 120 is increased quickly so that the first three way catalytic converter 120A quickly performs the catalytic function.

The exhaust gas is sent from the first three-way catalytic converter 120A to the second three-way catalytic converter 120B so that NOx contained in the exhaust gas is removed there. The first three-way catalytic converter 120A and the second three-way catalytic converter 120 have basically the same structure and function.

The first oxygen sensor 102A, arranged upstream of the first three-way catalytic converter 120A, detects the oxygen concentration in the exhaust gas that will pass through the first three-way catalytic converter 120A. The second oxygen sensor 102B, arranged at the position downstream of the first three-way catalytic converter 120A and upstream of the second three-way catalytic converter 120B, detects the oxygen concentration in the exhaust gas that has passed through the first three-way catalytic converter 120A and that will pass through the three-way catalytic converter 120B. The ratio between the fuel and air contained in the exhaust gas, that is, the air-fuel ratio can be detected based on the detected oxygen concentration.

The first oxygen sensor 102A and the second oxygen sensor 102B each output an electric current corresponding to the detected oxygen concentration in the exhaust gas. The value of the electric current is converted into, for example, a voltage value, and a signal indicating the voltage value is transmitted to the ECU 100. Accordingly, the air-fuel ratio of the exhaust gas present upstream of the first three-way catalytic converter 120A is detected based on the signal transmitted from the first oxygen sensor 102A. Similarly, the air-fuel ratio of the exhaust gas present upstream of the second three-way catalytic converter 120B is detected based on the signal transmitted from the second oxygen sensor 102B. The first oxygen sensor 102A and the second oxygen sensor 102B each output a voltage at or around 0.1V when the air-fuel ratio is higher than the stoichiometric air-fuel ratio. On the other hand, when the air-fuel ratio is lower than the stoichiometric air-fuel ratio, the first oxygen sensor 102A and the second oxygen sensor 102B each output a voltage at or around 0.9V. The air-fuel ratios calculated based on these voltage values are compared with a threshold values of the air-fuel ratio. Based on the result of comparison, the ECU 100 performs the air-fuel ratio control.

The first three-way catalytic converter 120A and the second three-way catalytic converter 120B each have the function of reducing NOx while oxidizing HC and CO when the air-fuel ratio is at or around the stoichiometric air-fuel ratio, namely, the function of concurrently removing HC and CO, and NOx. When the air-fuel ratio is higher than the stoichiometric air-fuel ratio and the exhaust gas contains a great amount of oxygen, the first three-way catalytic converter 120A and the second three-way catalytic converter 120B each efficiently oxidize HC and CO, but poorly reduce NOx. On the other hand, when the air-fuel ratio is lower than the stoichiometric air-fuel ratio and the exhaust gas contains a small amount of oxygen, the first three-way catalytic converter 120A and the second three-way catalytic converter 120B each efficiently reduce NOx, but poorly oxidize HC and CO. Therefore, it is not possible to remove all the three specific elements appropriately.

The catalyst of such three-way catalytic converter is not activated until the temperature thereof increases to a predetermined temperature. Accordingly, the catalyst cannot perform a desired function. Therefore, immediately after the engine 150 is started while it is cold, the catalyst quick warm-up control is performed. In the catalyst quick warm-up control, the valve overlap duration is increased while the ignition timing is retarded.

In the catalyst quick warm-up control, the amount of gas remaining in the cylinder is increased by increasing the valve overlap duration. As a result, the combustion proceeds more slowly. Also, the ignition timing is retarded. As a result, the combustion state is brought into the so-called "afterburning" state in which combustion of the air-fuel mixture takes place at the late stage of the power stroke. Thus, the exhaust gas having a high-temperature is discharged from the engine 150. Because the high-temperature exhaust gas passes through the exhaust port, a great amount of heat is transferred to a cylinder head (the coolant flowing through the coolant passage in the cylinder head). Thus, the engine 150 is warmed more quickly. Also, the three-way catalytic converter 120A arranged in the exhaust system 154 is activated quickly and performs the catalytic function more promptly. As a result, the three-way catalytic converter 120A quickly starts purification of the exhaust gas. Therefore, it can be said that there is a correlation between the engine coolant temperature THW and a catalyst temperature THC.

Performing the idle speed control compensates for decreases or variations in the engine speed due to the above-described control performed when the engine 150 is cold.

The hydraulic fluid discharged from the oil pump driven by the engine 150 is used to control the OCV of the VVT controller 300 when the valve overlap duration sufficient for quickly warming the catalyst is obtained. Accordingly, immediately after the engine 150 is started, the hydraulic pressure of the hydraulic fluid is low and, therefore, the open timing of the intake valve cannot be advanced (when the engine 150 is at a standstill, the OCV of the VVT controller 300 is kept, by a spring, in the state where the open timing of the intake valve is most retarded, and the valve overlap duration is shortest). Especially, when the temperature is low, the viscosity of the hydraulic fluid is high and the OCV is not effectively controlled by the hydraulic fluid.

Therefore, the ECU 100 according to the embodiment of the invention increases the operate angle using the VVLA controller 200 driven by the electric motor until the hydraulic pressure of the hydraulic fluid, which controls the OCV of the VVT controller 300, is increased to a predetermined value. Thus, even immediately after the engine 150 is started while it is cold, the sufficient valve overlap duration is obtained. When the hydraulic pressure used to control the OCV of the VVT controller 300 has been increased to the predetermined value, the ECU 100 switches the control, without changing the open timing of the intake valve, from the control for increasing the operate angle of the intake valve, which is performed by the VVLA controller 200, to the control for advancing the open timing of the intake valve, which is performed by the VVT controller 300.

Figure 2A:
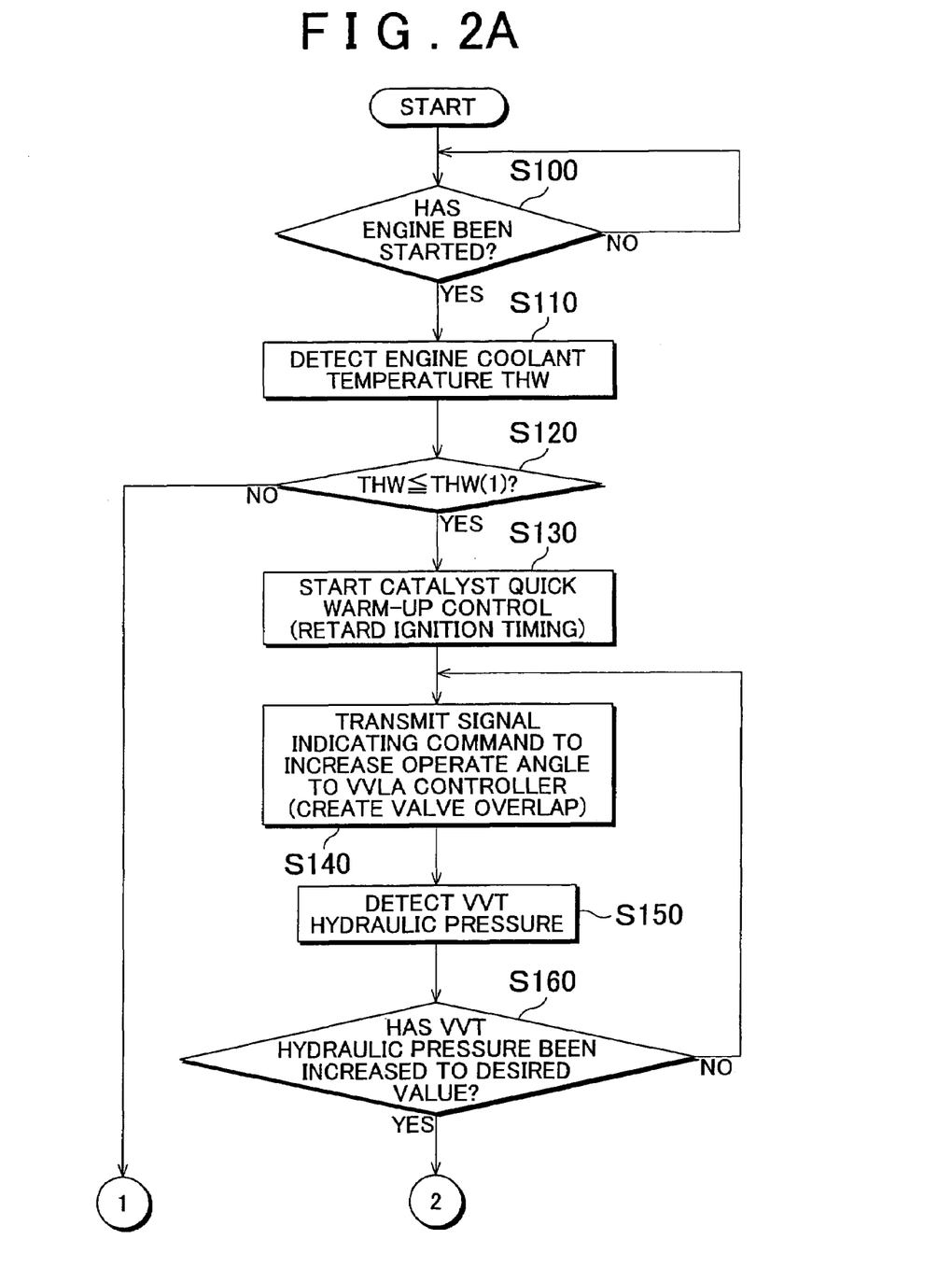
FIGS. 2A and 2B are a flowchart of a routine performed by an ECU that forms a part of the control apparatus according to the embodiment of the invention.
Figure 2B:
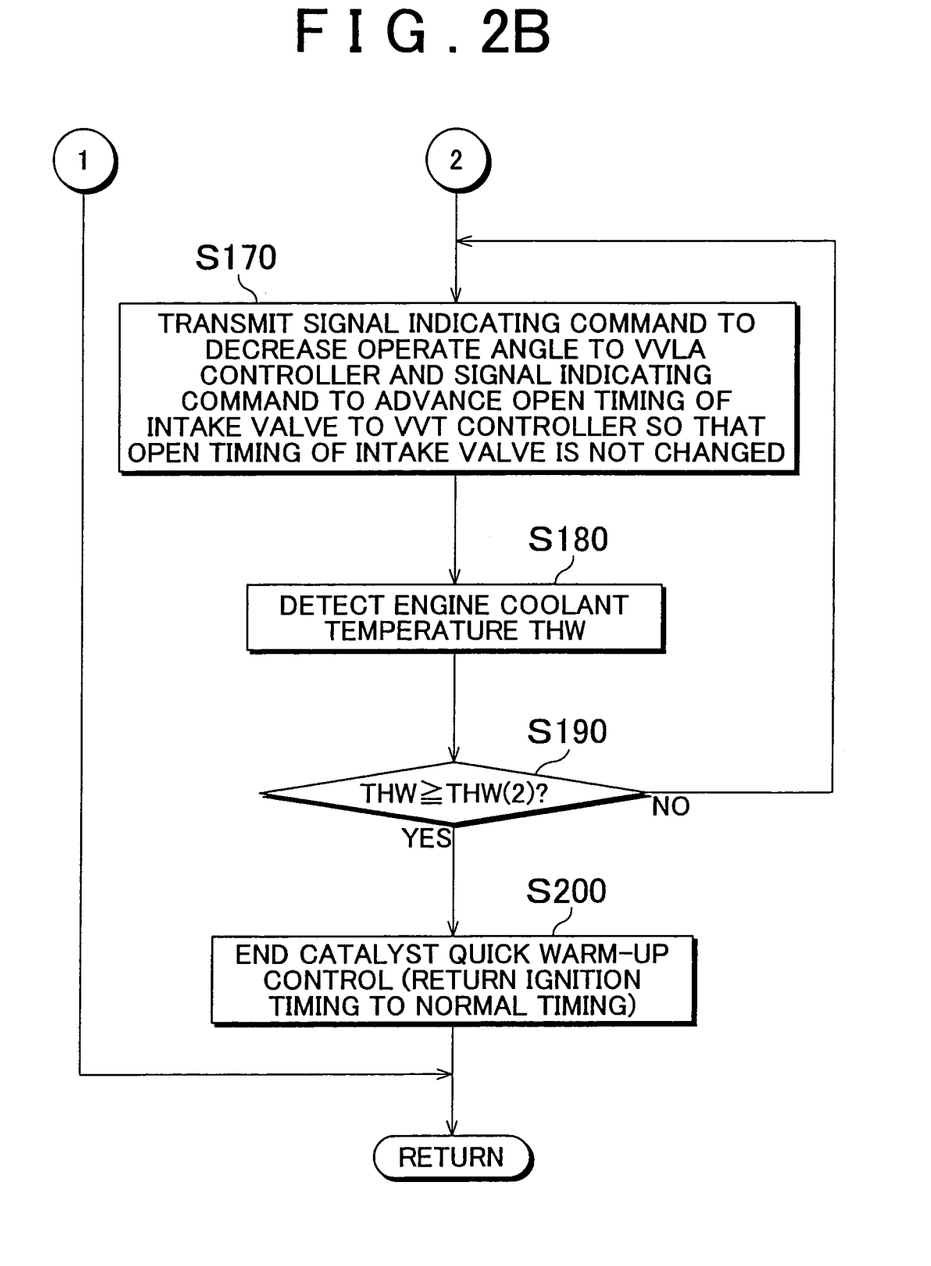

Hereafter, the routine performed by the ECU 100 that forms a part of the control apparatus according to the embodiment of the invention will be described with reference to FIG. 2. The routine is performed at predetermined time intervals (for example, at intervals of 8 milliseconds). The routine is started while the engine 150 is at a standstill.

In step S100, the ECU 100 determines whether the engine 150 has been started. The determination is made based on the position of an ignition switch (OFF, ACC, ON, START, etc.). If it is determined that the engine 150 has been started ("YES" in step S100), step S110 is performed. On the other hand, if it is determined that the engine 150 has not been started ("NO" in step S100), step S100 is periodically performed until a determination that the engine 150 has been started is made in step S100.

In step S110, the ECU 100 detects the engine coolant temperature THW based on the signal transmitted from the coolant temperature sensor 106. In step S120, the ECU 100 determines whether the engine coolant temperature THW is equal to or lower than a threshold value THW(1). The threshold value THW(1) is used to determine whether the catalyst needs to be quickly warmed. If it is determined that the engine coolant temperature THW is equal to or lower than the threshold value THW(1) ("YES" in step S120), it is determined that the catalyst needs to be warmed quickly because the engine 150 has been started while it is cold. Then, step S130 is performed. If it is determined in step S120 that the engine coolant temperature THW is higher than the threshold value THW(1) ("NO" in step S120), the routine ends. Namely, the engine 150 is brought into the normal operating state.

Whether the catalyst quick warm-up control needs to be performed can be determined based on the engine coolant temperature THW, because there is a correlation between the engine coolant temperature THW and the temperature of the catalyst.

Alternatively, whether the catalyst quick warm-up control needs to be performed may be determined based on the directly detected temperature of the catalyst (the three-way catalytic converter 120A and/or the three-way catalytic converter 120B), not based on the engine coolant temperature THW.

In step S130, the ECU 100 starts the catalyst quick warm-up control. After the catalyst quick warm-up control is started until it ends, the ignition timing by the spark plug in the engine 150 is retarded.

In step S140, the ECU 100 transmits a signal, indicating a command to increase the operate angle, to the VVLA controller 200. Thus, the operate angle of at least the intake valve is increased. As a result, the valve overlap duration, during which both the intake valve and the exhaust valve are open and which is as long as the valve overlap duration obtained by advancing the open timing of the intake valve, is obtained.

In step S150, the ECU 100 detects a hydraulic pressure of the hydraulic fluid used to control the OCV of the VVT controller 300 (hereinafter, referred to as a "VVT hydraulic pressure"). The VVT controller 300 detects the hydraulic pressure used to activate the OCV of the VVT controller 300, and transmits a signal indicating the detected hydraulic pressure to the ECU 100, whereby the ECU 100 detects the VVT hydraulic pressure.

In step S160, the ECU 100 determines whether the VVT hydraulic pressure has increased to a desired hydraulic pressure. The desired hydraulic pressure is the hydraulic pressure at which the OCV can be controlled so that the VVT controller 300 advances the open timing of the intake valve. If it is determined that the VVT hydraulic pressure has increased to the desired hydraulic pressure ("YES" in step S160), step S170 is performed. On the other hand, if it is determined that the VVT hydraulic pressure has not increased to the desired hydraulic pressure ("NO" in step S160), step S140 is performed again. Alternatively, step S150 may be performed again, if a negative determination is made in step S160 ("NO" in step S160).

In step S170, the ECU 100 transmits a signal indicating a command to decrease the operate angle of the intake valve to the VVLA controller 200, and a signal indicating a command to advance the open timing of the intake valve to the VVT controller 300 so that the open timing of the intake valve is not changed.

In step S180, the ECU 100 detects the engine coolant temperature THW based on a signal from the coolant temperature sensor 106. In step S190, the ECU 100 determines whether the engine coolant temperature THW is equal to or higher than a threshold value THW(2). The threshold value THW(2) is used to determine whether the catalyst has been sufficiently warmed. If it is determined that the engine coolant temperature THW is equal to or higher than the threshold value THW(2) ("YES" in step S190), it is determined that the temperature of the catalyst (the three-way catalytic converter 120A and/or the three-way catalytic converter 120B) has been sufficiently increased. Then, step S200 is performed. On the other hand, if it is determined that the engine coolant temperature THW is lower than the threshold value THW(2) ("NO" in step S190), step S170 is performed again. Alternatively, step S180 may be performed again, if a negative determination is made in step S190.

Whether the catalyst has been warmed sufficiently is determined based on the engine coolant temperature THW, because there is a correlation between the engine coolant temperature THW and the temperature of the catalyst.

Whether catalyst has been warmed sufficiently may be determined based on the directly detected temperature of the catalyst (the three-way catalytic converter 120A and/or the three-way catalytic converter 120B), not based on the engine coolant temperature THW. Alternatively, an integral engine speed may be obtained by integrating the engine speed after the engine 150 is started or an integral engine running time may be obtained by integrating the engine running time after the engine 150 is started. Then, it may be determined that catalyst has been warmed sufficiently, if the integral engine speed or the integral engine running time exceeds a predetermined threshold value.

In step S200, the ECU 100 ends the catalyst quick warm-up control. Then, the ignition timing by the spark plug in the engine 150, the actuation timing of the intake valve, the actuation timing of the exhaust valve, etc. are returned to those in the normal control.

Hereafter, the operation of the ECU 100, which forms a part of the control apparatus according to the embodiment of the invention and which has the above-described structure and performs the above-described routine, will be described with reference to FIG. 3. The case where the engine 150 is started while it is cold will be described below.

When it is determined that the engine 150 has been started ("YES" in step S100), the engine coolant temperature THW is detected (step S110). If the engine coolant temperature THW is equal to or lower than the threshold value THW(1) ("YES" in step S120), it is determined that the temperature of the catalyst (the three-way catalytic converter 120A and/or the three-way catalytic converter 120B) is so low that the catalyst needs to be warmed quickly. This is the state at time t(1) in FIG. 3. At time t(1), the catalyst temperature THC is equal to or lower than the threshold value THC(1), and the catalyst needs to be warmed quickly. As described above, there is a correlation between the catalyst temperature THC and the engine coolant temperature THW. The correlation between the engine coolant temperature THW and the catalyst temperature THC is so strong that the threshold value THC(1) for the catalyst temperature THC can be estimated based on the threshold value THW(1) for the engine coolant temperature THW.

The catalyst quick warm-up control is started (step S130), and the ignition timing is retarded. Thus, the combustion state is brought into the so-called "afterburning" state in which combustion of the air-fuel mixture takes place at the later stage of the power stroke.

The signal indicating the command to increase the operate angle is transmitted to the VVLA controller 200 (S140). Because the VVLA controller 200 increases the operate angle of the intake valve according to the command, the valve overlap duration is increased. An increase in the valve overlap duration increases the amount of gas remaining in the cylinder, which causes the combustion to proceed more slowly. Then, the exhaust gas having a high-temperature is discharged from the engine 150. Accordingly, the high-temperature exhaust gas passes through the exhaust port and reaches the catalyst (the thee-way catalytic converter 120A and/or the three-way catalytic converter 120B). Therefore, the temperature of the catalyst (the three-way catalytic converter 120A and/or the three-way catalytic converter 120B) starts to increase quickly.

The engine 150 is operated in this state (afterburning state), and the hydraulic pressure of the hydraulic fluid used to control the OCV of the VVT controller 300 is gradually increased by the hydraulic fluid discharged from the oil pump driven by the engine 150 ("YES" in S160). This is the state at time t(2) in FIG. 3. At time t(2), the VVT hydraulic pressure increases, and the open timing of the intake valve is advanced by the VVT controller 300, whereby the valve overlap duration is increased. In the period from time t(2) to time t(3), the ECU 100 switches the method for increasing the valve overlap duration from increasing the operate angle of the intake valve using the VVLA controller 200 to advancing the open timing of the intake valve using the VVT controller 300.

Figure 3:
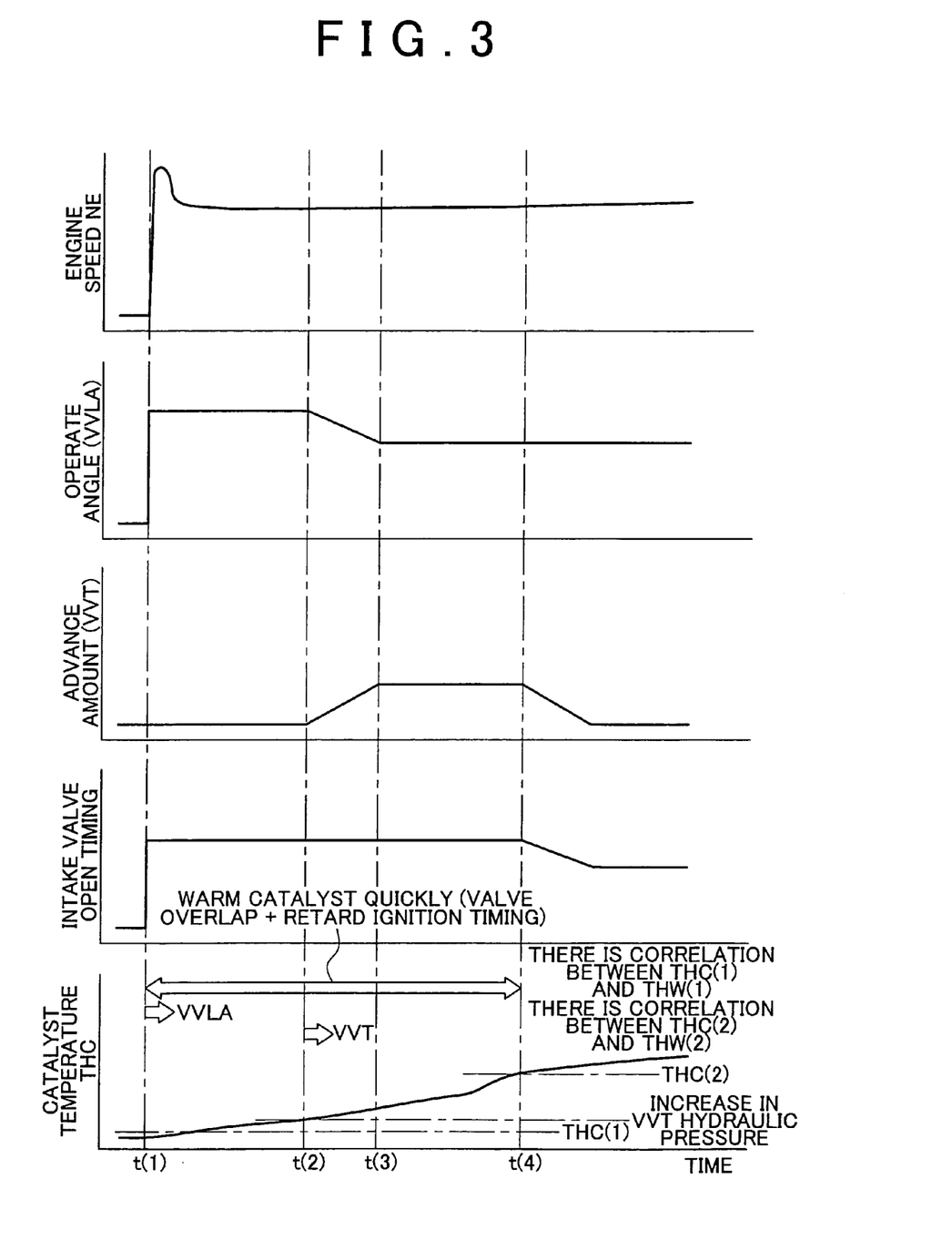
FIG. 3 is a timing chart showing the state of the engine controlled by the ECU that forms a part of the control apparatus according to the embodiment of the invention.

At this time, the open timing of the intake valve is not changed, as shown in FIG. 3. Namely, the ECU 100 transmits the signal indicating the command to decrease the operate angle of the intake valve to the VVLA controller 200, and the signal indicating the command to advance the open timing of the intake valve to the VVT controller 300 so that the open timing of the intake valve is not changed (S170). For example, the relationship between the magnitude (duty) of the signal indicating the command to decrease the operate angle of the intake valve and the magnitude (duty) of the signal indicating the command to advance the open timing of the intake valve, which satisfies the condition where the open timing of the intake valve is not changed, may be stored in the form of a map in advance. Based on the map, the ECU 100 transmits the signal indicating the command to decrease the operate angle of the intake valve and the signal indicating the command to advance the open timing of the intake valve.

As described above, the command signals are transmitted to the VVLA controller 200 and the VVT controller 300 in the period from time t(2) to time t(3). As shown in FIG. 3, the operate angle is gradually decreased by the VVLA controller 200, and the open timing is gradually advanced by the VVT controller 300. At time t(3), the method for increasing the valve overlap duration has been completely switched from increasing the operate angle of the intake valve using the VVLA controller 200 to advancing the open timing of the intake valve using the VVT controller 300. In this state as well, it is estimated that the catalyst (the three-way catalytic converter 120A and/or the three-way catalytic converter 120B) has not been sufficiently warmed.

When the engine coolant temperature THW is equal to or higher than the threshold value THW(2) ("YES" in step S190), it is determined that the temperature of the catalyst (the three-way catalytic converter 120A and/or the three-way catalytic converter 120B) has been increased and it can be determined that the catalyst has been sufficiently warmed. This is the state at time t(4) in FIG. 3. At time t (4), the catalyst temperature THC is equal to the threshold value THC (2), and catalyst has been warmed sufficiently. As described above, there is a correlation between the catalyst temperature THC and the engine coolant temperature THW. The correlation between the engine coolant temperature THW and the catalyst temperature THC is so strong that the threshold value THC(2) for the catalyst temperature THC can be estimated based on the threshold value THW(2) for the engine coolant temperature THW.

With the control apparatus for an internal combustion engine according to the embodiment of the invention, when the engine is started while it is cold, the VVT controller, which is hydraulically actuated by the hydraulic fluid discharged from the oil pump driven by the engine, cannot be used, because the hydraulic pressure of the hydraulic fluid is low (including the case where the VVT controller cannot be used because it does not operate properly). Accordingly, the operate angle is increased using the VVLA controller which is electrically actuated by the electric motor, instead of using the VVT controller, so that the valve overlap duration is increased. In addition, the combustion state can be brought into the so-called "afterburning" state by retarding the ignition timing. Thus, the three-way catalytic converter arranged in the exhaust system is activated promptly by the exhaust gas discharged from the engine, and purification of the exhaust gas is started promptly after the engine is started. In addition, when the hydraulic pressure used to control the OCV of the VVT controller has increased to the predetermined value, the method for increasing the valve overlap duration is switched from increasing the operate angle using the VVLA controller to advancing the open timing of the intake valve using the VVT controller. Thus, the VVT controller can increase the valve overlap duration independently of the amount of valve lift, although whether the valve overlap duration is increased sufficiently is influenced by the properties of the VVLA controller. The mechanism that is used to increase the valve overlap duration is switched to the VVT controller to decrease the valve lift and the intake air amount, whereby the fuel efficiency improves. At this time, the open timing of the intake valve is not changed. Accordingly, unstable combustion is avoided.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for an internal combustion engine; comprising:
   an electric variable valve mechanism that is actuated by an electric actuator;
   a warm-up determination portion that determines, after the internal combustion engine is started, whether a warm-up needs to be performed;
   a first control portion that controls, if it is determined that the warm-up needs to be performed, the electric variable valve mechanism so that a valve overlap duration is increased;
   a second control portion that controls the internal combustion engine so that ignition timing is retarded based on an increase in the valve overlap duration,
   a hydraulic variable valve mechanism that is hydraulically actuated by hydraulic fluid discharged from an oil pump that is driven by the internal combustion engine;
   an operation determination portion that determines, based on a pressure of the hydraulic fluid, whether the hydraulic variable valve mechanism is able to operate properly; and
   a switching portion that switches, if it is determined that the hydraulic variable valve mechanism is able to operate properly, a mechanism used to increase the valve overlap duration from the electric variable valve mechanism to the hydraulic variable valve mechanism.

2. The control apparatus according to claim 1, wherein the operation determination portion determines, if the pressure of the hydraulic fluid is equal to or higher than a predetermined pressure, that the hydraulic variable valve mechanism is able to operate properly.

3. The control apparatus according to claim 1, wherein the switching portion switches the mechanism used to increase the valve overlap duration from the electric variable valve mechanism to the hydraulic variable valve mechanism so that open timing of an intake valve of the internal combustion engine is not changed.

4. The control apparatus according to claim 1, wherein the warm-up determination portion determines whether a warm-up for activating a catalyst, which is included in an exhaust gas purification mechanism arranged in an exhaust system of the internal combustion engine and which purifies exhaust gas, needs to be performed.

5. The control apparatus according to claim 1, wherein the electric variable valve mechanism changes an operate angle of at least one of an intake valve and an exhaust valve of the internal combustion engine.

6. The control apparatus according to claim 1, wherein the electric variable valve mechanism changes an operate angle and a valve lift of at least one of an intake valve and an exhaust valve of the internal combustion engine.

7. The control apparatus according to claim 1, wherein the hydraulic variable valve mechanism changes actuation timing of at least one of an intake valve and an exhaust valve of the internal combustion engine.

8. A control method for an internal combustion engine, comprising
   determining, after the internal combustion engine is started, whether a warm-up needs to be performed;
   controlling, if it is determined that the warm-up needs to be performed, an electric variable valve mechanism, which is actuated by an electric actuator, so that a valve overlap duration is increased;
   controlling the internal combustion engine so that ignition timing is retarded based on an increase in the valve overlap duration,
   determining, based on a pressure of hydraulic fluid discharged from an oil pump that is driven by the internal combustion engine, whether a hydraulic variable valve mechanism, which is hydraulically actuated by the hydraulic fluid, is able to operate properly; and
   switching, if it is determined that the hydraulic variable valve mechanism is able to operate properly, a mechanism used to increase the valve overlap duration from the electric variable valve mechanism to the hydraulic variable valve mechanism.

9. The control method according to claim 8, wherein it is determined, if the pressure of the hydraulic fluid is equal to or higher than a predetermined pressure, that the hydraulic variable valve mechanism is able to operate properly.

10. The control method according to claim 8, wherein the mechanism used to increase the valve overlap duration is switched from the electric variable valve mechanism to the hydraulic variable valve mechanism so that open timing of an intake valve of the internal combustion engine is not changed.

11. The control method according to claim 8, wherein it is determined whether a warm-up for activating a catalyst, which is included in an exhaust gas purification mechanism arranged in an exhaust system of the internal combustion engine and which purifies exhaust gas, needs to be performed.

12. The control method according to claim 8, wherein an operate angle of at least one of an intake valve and an exhaust valve of the internal combustion engine is changed by the electric variable valve mechanism.

13. The control method according to claim 8, wherein an operate angle and a valve lift of at least one of an intake valve and an exhaust valve of the internal combustion engine is changed by the electric variable valve mechanism.

14. The control method according to claim 8, wherein actuation timing of at least one of an intake valve and an exhaust valve of the internal combustion engine is changed by the hydraulic variable valve mechanism.

* * * * *